(12) United States Patent
Guo et al.

(10) Patent No.: US 10,333,939 B2
(45) Date of Patent: Jun. 25, 2019

(54) SYSTEM AND METHOD FOR AUTHENTICATION

(71) Applicant: Alibaba Group Holding Limited, Grand Cayman (KY)

(72) Inventors: Dong Guo, Hangzhou (CN); Panfeng Yuan, Hangzhou (CN); Xin Liu, Hangzhou (CN); Tingliang Chen, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 173 days.

(21) Appl. No.: 15/251,336

(22) Filed: Aug. 30, 2016

(65) Prior Publication Data

US 2017/0063862 A1 Mar. 2, 2017

(30) Foreign Application Priority Data

Sep. 1, 2015 (CN) .......................... 2015 1 0551943

(51) Int. Cl.
*G06F 7/04* (2006.01)
*H04L 29/06* (2006.01)
(Continued)

(52) U.S. Cl.
CPC ............ *H04L 63/101* (2013.01); *G06F 21/31* (2013.01); *G06F 21/6218* (2013.01);
(Continued)

(58) Field of Classification Search
CPC ... H04L 63/101; H04L 63/104; H04L 63/083; G06F 21/6218; G06F 21/31; G06F 21/62; G06F 2221/2141
(Continued)

(56) References Cited

U.S. PATENT DOCUMENTS

| | | | |
|---|---|---|---|
| 8,196,175 B2 | 6/2012 | Reed et al. | |
| 8,418,222 B2 | 4/2013 | Gbadegesin et al. | |

(Continued)

OTHER PUBLICATIONS

Microsoft Azure Marketplace, available at http://web.archive.org/web/20150623025816/http://azure.microsoft.com/en-us/marketplace/? (Jun. 23, 2015).

(Continued)

*Primary Examiner* — Aravind K Moorthy

(74) *Attorney, Agent, or Firm* — James J. DeCarlo; Greenberg Traurig, LLP

(57) ABSTRACT

An apparatus and a method allow for authentication of user information in an application system. The method includes receiving an authentication request, the authentication request including user information and candidate permission point information, and confirming at least one piece of upper layer subject information associated with the user information. The method also includes acquiring a first set of permission point information associated with the user information, and acquiring a second set of permission point information associated with the at least one upper layer subject information. The method continues with determining an authentication set based on an intersection of the first set of permission point information and the second set of permission point information, and determining that the authentication is successful if the candidate permission point information is in the authentication set.

20 Claims, 5 Drawing Sheets

(51) Int. Cl.
*G06F 21/00* (2013.01)
*G06F 21/31* (2013.01)
*G06F 21/62* (2013.01)

(52) U.S. Cl.
CPC .......... *H04L 63/083* (2013.01); *H04L 63/104* (2013.01); *G06F 2221/2141* (2013.01)

(58) Field of Classification Search
USPC .................................. 726/4, 5; 713/165, 182
See application file for complete search history.

(56) References Cited

U.S. PATENT DOCUMENTS

| | | | |
|---|---|---|---|
| 8,682,958 B2 | 3/2014 | Ma | |
| 8,769,622 B2 | 7/2014 | Chang et al. | |
| 8,769,644 B1 | 7/2014 | Eicken et al. | |
| 8,856,954 B1 | 10/2014 | Hathaway et al. | |
| 9,106,659 B2 | 8/2015 | Ma | |
| 9,134,912 B2 | 9/2015 | Li et al. | |
| 9,158,465 B2 | 10/2015 | Li et al. | |
| 9,209,973 B2 | 12/2015 | Aikas et al. | |
| 9,210,178 B1 | 12/2015 | Roth et al. | |
| 9,215,229 B2 | 12/2015 | Eicken et al. | |
| 9,288,214 B2 | 3/2016 | Chang et al. | |
| 9,300,660 B1 | 3/2016 | Borowiec et al. | |
| 9,319,286 B2 | 4/2016 | Panuganty | |
| 9,397,990 B1 | 7/2016 | Taly et al. | |
| 2003/0154406 A1 | 8/2003 | Honavar et al. | |
| 2006/0074913 A1* | 4/2006 | O'Sullivan | G06F 21/6218 |
| 2006/0224590 A1* | 10/2006 | Boozer | G06F 21/6218 |
| 2007/0083915 A1* | 4/2007 | Janakiraman | G06F 21/316 |
| | | | 726/4 |
| 2007/0214364 A1 | 9/2007 | Roberts | |
| 2009/0064303 A1* | 3/2009 | Dickinson | G06Q 10/06 |
| | | | 726/10 |
| 2009/0249477 A1 | 10/2009 | Punera | |
| 2009/0254561 A1* | 10/2009 | Shao | H04L 67/306 |
| 2011/0016536 A1 | 1/2011 | O'Brien et al. | |
| 2011/0191838 A1 | 8/2011 | Yanagihara | |
| 2011/0321154 A1* | 12/2011 | Dau | G06F 21/6218 |
| | | | 726/17 |
| 2012/0311672 A1* | 12/2012 | Connor | G06F 21/604 |
| | | | 726/4 |
| 2013/0074158 A1* | 3/2013 | Koskimies | H04L 63/0428 |
| | | | 726/4 |
| 2013/0239166 A1 | 9/2013 | MacLeod et al. | |
| 2013/0283350 A1* | 10/2013 | Afek | G06F 21/6218 |
| | | | 726/4 |
| 2014/0149461 A1 | 5/2014 | Wijayaratne et al. | |
| 2014/0172799 A1 | 6/2014 | Dorman | |
| 2014/0282889 A1* | 9/2014 | Ishaya | H04L 63/08 |
| | | | 726/4 |
| 2014/0298436 A1 | 10/2014 | Lin | |
| 2015/0100547 A1 | 4/2015 | Holmes-Higgin et al. | |
| 2015/0128215 A1 | 5/2015 | Son et al. | |
| 2015/0188906 A1 | 7/2015 | Minov et al. | |

OTHER PUBLICATIONS

Jingdong Data Compass, available at http://web.archive.org/web/20150508012647/http://luopan.jd.com/ (May 8, 2015).
International Search Report and Written Opinion to corresponding International Application No. PCT/US16/49562 dated Nov. 21, 2016 (9 pages).

* cited by examiner

SYSTEM AND METHOD FOR AUTHENTICATION

CROSS-REFERENCE TO RELATED APPLICATIONS

This application claims the benefit of priority from Chinese Patent Application No. 201510551943.8, filed on Sep. 1, 2015, entitled "Method and Apparatus for Authentication," which is incorporated herein by reference in its entirety.

BACKGROUND

Field of the Disclosure

The present disclosure generally relates to authorization management in computer systems, and in particular, relates to systems and methods for facilitating the authentication of users.

Description of Related Art

In general, "authorization management" refers to how users may access authorized resources, and only authorized resources, in accordance with the security rules or policies defined by a system. Authorization management technology manages the permissions of subjects to access objects in application systems, and may be applied to any application system after a user logs into the system (e.g., using a user account and a password).

In the related art, subjects may be a variety of users, and the access objects may be resources controlled or used by the system, including, without limitation, resources utilized by each module of the system such as server resources, data services, database resources, or the like. Application systems generally map permission information to individual users in advance and store these mappings using, for example, an ID of the user. In this manner, during the process of system authentication, the permission information of a user is identified according to the logged in user's ID. The identified permissions may then be used to control access to resources for the logged in user, thereby implementing a basic authorization management system.

In some specialized application systems (e.g., big data platforms), subjects may comprise other entities, such as tenants, projects, and the like, depending on the needs of the application system. In systems that include a variety of subjects, users are often assigned to one or more projects or tenants in order to implement authorization management. Additionally, permissions to access system resources are also different with respect to the different projects or tenants. Thus the current technology of authorization management in application systems including a variety of subjects is still deficient.

BRIEF SUMMARY

Among the solutions realized with the embodiments of the present disclosure is the provision of an authentication method and an authentication apparatus that solve the prior art shortcomings of authorization management in an application system comprising a plurality of subjects. To solve the above technical problem, an authentication method and an authentication apparatus according to the embodiments of the present disclosure are implemented as follows.

One aspect of the present disclosure is drawn to a method for authentication of user information in an application system. The method includes receiving an authentication request, the authentication request including user information and candidate permission point information, confirming at least one piece of upper layer subject information associated with the user information, and acquiring a first set of permission point information associated with the user information, the first set of permission point information including at least one piece of permission point information associated with the user information. The method also includes acquiring a second set of permission point information corresponding to the at least one upper layer subject information and including at least one piece of permission point information according to the at least one piece of upper layer subject information, and determining an intersection of the first set and the second set as an authentication set. The method further includes determining that the authentication is successful if the candidate permission point information is in the authentication set.

One aspect of the present disclosure is drawn to a method for authentication of user information in an application system. The method includes receiving an authentication request including user information and a candidate information set, the candidate information set including at least one piece of candidate permission point information, and confirming at least one piece of upper layer subject information associated with the user information.

The method also includes acquiring a first set of permission point information associated with the user information and including at least one piece of permission point information associated with the user information, and acquiring a second set of permission point information associated with the at least one upper layer subject information, the second set of permission point information including at least one piece of permission point information associated with the at least one piece of upper layer subject information. The method further includes determining an authentication set based on an intersection of the first set of permission point information and the second set of permission point information, and determining a third set of permission point information associated with the authentication request as passing authentication if the candidate information set intersects with the authentication set.

One aspect of the present disclosure is drawn to an apparatus for authentication of user information in an application system. The apparatus includes a processor and a non-transitory memory storing computer-executable instructions. When executed by the processor, the instructions cause the apparatus to receive an authentication request, the authentication request including user information and candidate permission point information, and confirm at least one piece of upper layer subject information associated with the user information.

The instructions also cause the apparatus to acquire a first set of permission point information associated with the user information, the first set of permission point information including at least one piece of permission point information associated with the user information, and acquire a second set of permission point information associated with the at least one upper layer subject information, the second set of permission point information including at least one piece of permission point information associated with the at least one piece of upper layer subject information. The instructions further cause the apparatus to determine an authentication set based on an intersection of the first set of permission point information and the second set of permission point information and to determine that the authentication is successful if the candidate permission point information is in the authentication set.

One aspect of the present disclosure is drawn to an apparatus for authentication of user information in an application system. The apparatus includes a processor and a non-transitory memory storing computer-executable instructions. When executed by the processor, the instructions cause the apparatus to receive an authentication request including user information and a candidate information set, the candidate information set including at least one piece of candidate permission point information, and confirm at least one piece of upper layer subject information associated with the user information.

The instructions also cause the apparatus to acquire a first set of permission point information associated with the user information and including at least one piece of permission point information associated with the user information, and acquire a second set of permission point information associated with the at least one upper layer subject information, the second set of permission point information including at least one piece of permission point information associated with the at least one piece of upper layer subject information. The instructions further cause the apparatus to determine an authentication set based on an intersection of the first set of permission point information and the second set of permission point information, and determine a third set of permission point information associated with the authentication request as passing authentication if the candidate information set intersects with the authentication set.

BRIEF DESCRIPTION OF THE DRAWINGS

The accompanying drawings described herein are intended, when taken together with the following detailed description, to provide further understanding of the present disclosure. The embodiments of the present disclosure and the description thereof are intended for further explaining and clarifying the present disclosure; the scope of the present disclosure is not defined by the description or the accompanying drawings of any specific embodiments, but rather by the claims. The present disclosure includes the following accompanying drawings.

DETAILED DESCRIPTION

In order to make the objectives, technical solutions, and advantages of the present disclosure more clear, the present disclosure will be described below in detail with reference to the accompanying drawings and the particular embodiments.

Figure 1:
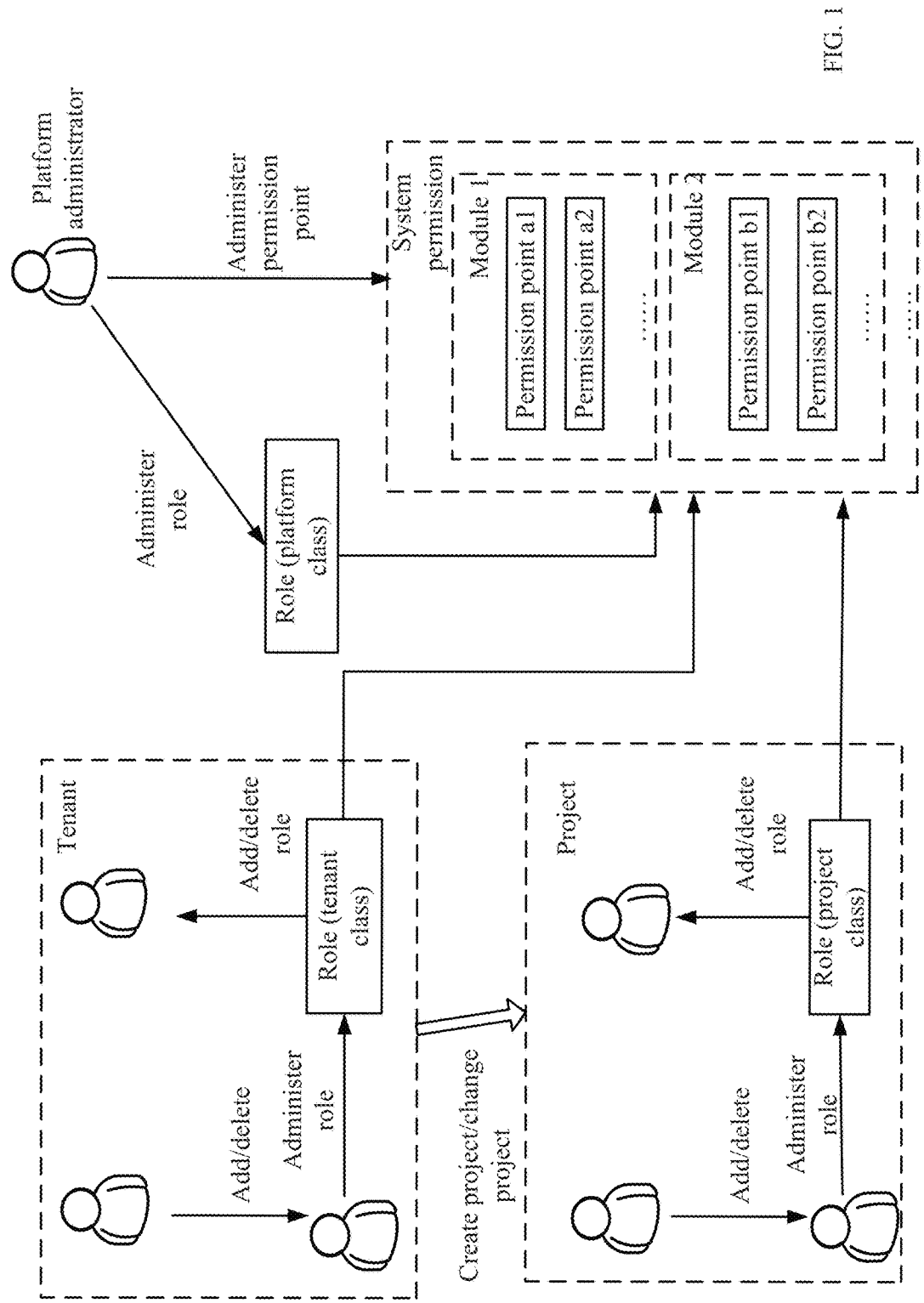
FIG. 1 is a diagram illustrating an architecture of an application system including a plurality of subjects according to some embodiments of the present disclosure.

FIG. 1 is a diagram illustrating an architecture of an application system including a plurality of subjects according to some embodiments of the present disclosure. The subjects of the architecture may include one or more users and an upper layer subject corresponding to each user. In one embodiment, the upper layer subject may be a tenant or a project. In the application system illustrated in FIG. 1, a platform management administration-class subject may also be included. In one embodiment, a platform management administration-class subject may include a platform administrator.

Generally, the application system includes one or more tenants with each tenant being associated with one or more projects and each project being associated with one or more users. A tenant may comprise a client group (e.g., a company) that uses or accesses resources of the application system or third-party systems. Likewise, a project may comprise a subgroup of the tenant (e.g., an organizational unit of a company or a product or task under development by the company). Each project may have a corresponding project space, the project space corresponding to a location in the application system where the users process data. Users may define different project spaces for different product lines.

The application system may assign a role for each subject in the system. The roles may include roles of the users, projects, tenants, and administration-class members. In the context of the projects and tenants, the roles of the users may also be categorized into roles of the users at the project level, tenant level, or both the project and tenant level. For example, as illustrated in FIG. 1, the roles of each tenant include owner of the tenant, administrator, and members. The business roles of the members may include tenant-class director, tenant-class section chief, tenant-class engineer, and the like. The roles of the members may be administered by the administrator and the owner of the tenant may add or delete an administrator.

Each tenant may additionally create, update, delete, or otherwise administer projects. The roles in a project may include the roles of owner, administrator, and members of the project. The business roles of members may include project-class director, project-class section chief, project-class engineer, and the like. The roles of the members may be administered by an administrator and the owner of the tenant may add or delete an administrator.

The roles of the platform administration-class members may include platform administrator, and the like. Roles assigned to the administrator may allow the platform administrator to administer platform-class roles and permission point information. As described more fully herein, permission point information includes a subject (e.g., a resource) and operations. Examples of operations include, a create operation of the administrator, view operation of an administrator list, create operation of a project, execution of an SQL operation, execution of a user-defined function, use operation of a data service, and the like.

In one embodiment, a tenant and project may be used as a group, and the group itself may have one or more corresponding roles. For example, an application system may comprise 1000 tenants and roles of the tenants may be categorized according to the classes of the tenants. That is, the roles of the tenants may include a set of n roles (e.g., {TenantRole$_1$, TenantRole$_2$, ... TenantRole$_n$}) and the 1000 tenants may be mapped to these n roles, according to the classes of the tenants. Likewise, the tenants may also define permissions for the projects administered by the tenants according to the needs of the tenants or projects. For example, a tenant may be associated with 100 projects and the roles of the projects may include a set of m roles (e.g., {ProjectRole$_1$, ProjectRole$_2$, ... ProjectRole$_m$}) and the 100 projects may be mapped to these m roles. The projects of other tenants on the application system may also be mapped to the set of m project roles.

The application system may additionally map role information to one or more pieces of permission point information (also referred to as a set comprising at least one piece of permission point information). For tenants, the application system may store a mapping between the tenants and tenant role information associated with each tenant. The application system may further store a mapping between the tenants and the one or more pieces of permission point information. For projects, the application system may map relationships between the projects and tenant role information and map relationships between the projects and the one or more pieces of permission point information. For the users, the application system may map relationships between the user information and the user role information (including project-class role information of the users, and tenant-class role information of the users) and map relationships between the user role information and the one or more pieces of permission point information.

As discussed above, an upper layer subject may be a tenant or a project. However, in alternative embodiments, upper layer subjects may also include other subjects, such as a group, a subsidiary of a group, a department of a subsidiary, or the like. In addition, while the preceding examples illustrate a single layer of upper level subjects, the number of subjects is not subject to a particular limitation. For example, the application system may utilize three layers of subjects, or more than three layers of subjects. The embodiments described herein are described using two layers of upper layer subjects (e.g., projects and tenants) solely as an example.

Figure 2:
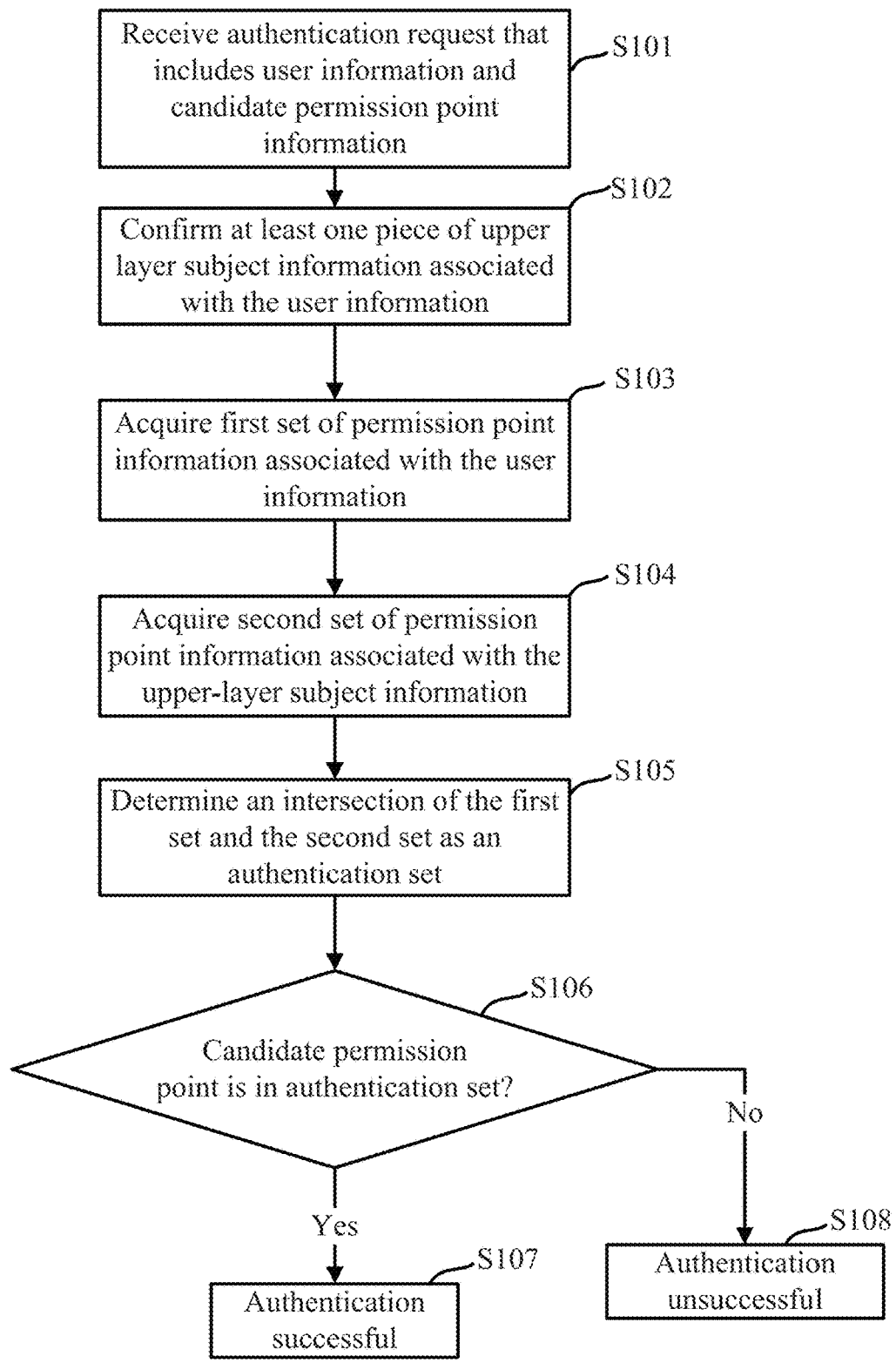
FIG. 2 is a flowchart of an authentication method according to some embodiments of the present disclosure.

FIG. 2 is a flowchart of an authentication method according to some embodiments of the present disclosure. The authentication method may be executed, for example, by a server of the application system.

In step S101 the method receives an authentication request that includes user information and candidate permission point information. In one embodiment, the method may receive the authentication request from a user terminal. The terminal may be a computer, a smart wireless terminal, a server, or the like accessing the server of the application system.

A user may log into the application system using user information (e.g., a user name or identifier) and/or a password. After successfully logging in, the user may transmit an authentication request including the user information and candidate permission point information to the server. In one embodiment, the user information of the authentication request is based on, or includes, the user information used previously for logging in to the application system.

In some embodiments, the candidate permission point information may include one or more pieces of candidate permission point information and may additionally be confirmed by the server based on the user information. In alternative embodiments, the candidate permission point information may be confirmed in response to specific operations performed by the user. For example, when the authenticated user attempts to perform an operation, the method may confirm that the user has permission to perform such an operation in response to the attempt to perform the operation.

In step S102, the method confirms at least one piece of upper layer subject information associated with the user information. For example, if there are two pieces of upper layer subject information, that is, tenant information and project information, then the method, in step S102, confirms the tenant information associated with the user information and confirms the project information associated with both the tenant information and the user information.

In one embodiment, each user may be categorized in advance in a corresponding upper layer subject (e.g., a tenant or project). For example, the user information may include the name "Zhang San," and the upper layer subject information associated with this user information may be: "X tenant," "Y project under X tenant." Although illustrated as textual values, the user information and upper layer subject information may be stored in any suitable format for retrieval by the application system.

In step S103, the method acquires a first set of permission point information associated with the user information that includes at least one piece of permission point information associated with the user information. In this embodiment, the permission point information included in the first set of permission point information, A, may correspond to the permissions of the users, that is, the permission subject is the user.

In some embodiments, as part of acquiring a first set of permission point information in step S103, the method may also query first role information mapped to the received user information. As discussed previously, the first role information may be used for identifying a role of a user identified by the user information in an upper layer subject corresponding to the upper layer subject information. After querying the first role information, the method may then acquire a first set of permission point information, A, comprising at least one piece of permission point information mapped to the first role information.

For example, in an application system having tenants and projects, the first role information mapped to the user information may include the tenant-class role of the user and the project-class role of the user. Continuing the previous example, it may be confirmed that the user associated with the user information "Zhang San" has a tenant-class role of "tenant-class director," and a project-class role of "project supervisor." According to the different user roles of the user in different upper layer subjects (e.g., "tenant-class director" and "project-class supervisor"), two sets A1 and A2 including at least one piece of permission point information corresponding to the respective user roles may be acquired by means of the aforementioned querying of first role information. That is, the two sets A1 and A2 respectively indicate the permissions possessed by the user in the tenant class and the project class. A first set of permission point information, A, may be an intersection of the sets A1 and A2. Specifically, if A1 includes a set of permission points {Q1, Q2, Q3, Q4} and A2 includes a set of permission points {Q1, Q3, Q5, Q4} the first set of permission points comprises the intersection of A1 and A2 (i.e., A1∩A2), that is, the set {Q1, Q3, Q4}.

According to some embodiments of the present disclosure, the upper layer subject in the application system may only include a tenant if there are no projects under the tenant. In these embodiments, the role information and the corresponding permission set of the user in the tenant class only need to be acquired. In addition, if the application system includes a large number of upper layer subjects, and one or more upper layer subjects are empty, a permission set may be configured to ensure that the finally acquired permission intersection is not empty for a given upper layer subject. For example, the permission set corresponding to an empty one or more upper layer subjects may comprise all possible permission points.

In step S104, the method acquires a second set of permission point information associated with the upper layer subject information that includes at least one piece of permission point information.

As described above, each of the upper layer subjects in the application system possess corresponding permissions. According to some embodiments of the present disclosure, if there are at least two pieces of upper layer subject information, the method, in step S104 may acquire a permission set corresponding to each of the two pieces of upper layer subject information, and determine the intersection of the permission sets corresponding to each of the at least two pieces of upper layer subject information as the second set of permission point information.

In some embodiments, as part of acquiring a second set of permission point information in the method in step S104, the method may also query second role information mapped to the upper layer subject information, the second role information used to identify a role of an upper layer subject corresponding to the upper layer subject information in an application system. After querying the second role information, the method may then acquire a second set of permission point information, B, that includes at least one piece of permission point information mapped to the second role information.

As discussed previously, in an application system having tenants and projects, the upper layer subject information may include tenant information and project information. In this embodiment, the corresponding second role information may include the role information of the tenant in the application system and the role information of the project in the application system. In some embodiments, the specific process of acquiring the second set B may include acquiring a permission set, B1, corresponding to the tenant information and including at least one piece of permission point information. The method may then acquire a permission set, B2, corresponding to the project information and including at least one piece of permission point information. Finally, the method may determine the intersection of the permission set B1 and the permission set B2 as a second set of permission point information, B.

Continuing the previous example with respect to the user identified by the user information "Zhang San," the method may query a mapping table between users and upper subjects and determine that the project information corresponding to the user information may be, for example, "Y project under X tenant." Additionally, the method may determine that the corresponding tenant information may be, for example, "X tenant." By using a mapping table between upper layer subject and subject roles, the method may determine that the role information corresponding to the identified project information ("Y project under X tenant") is "ProjectRole$_{11}$", and the role information corresponding to the identified tenant information ("X tenant") is "TenantRole$_{12}$."

By querying a mapping table between subject role information and permission point information, the method may determine that the permission set corresponding to the identified role information ("ProjectRole$_{11}$") is the set B1 including the set of permission points {Q1, Q2, Q3, Q4, Q5, Q6, Q8, Q10}, and that the permission set corresponding to the identified role information ("TenantRole$_{12}$") is the set B2 including the set of permission points {Q2, Q3, Q4, Q5, Q6, Q9, Q10}. In this example, the method may determine a second set of permission points by determining the intersection of sets B1 and B2 (i.e., B1∩B2), that is, the set {Q2, Q3, Q4, Q5, Q6, Q10}.

In step S105, the method determines the intersection of the first set of permission point information, A, and the second set of permission point information, B. The resulting intersection represents an authentication set C (i.e., C=A∩B).

In the some embodiments, the first set of permission point information, A, is a set of permission point information associated with the user in various upper layer subjects. The second set of permission point information, B, is a set of permission point information possessed by various upper layer subjects to which the user belongs. In the authorization management mechanism of the above application system, a set of permission point information corresponding to lower layer subjects (e.g., users) may be a subset of the set of permission point information corresponding to the upper layer subjects (e.g., tenants or projects).

For example, the user may be a lower layer subject of the project and tenant, and the project and tenant are the upper layer subjects of the user. In this case, the set of permission point information corresponding to the user is a subset of the set of permission point information corresponding to various tenants and projects. Therefore, an intersection of the first set of permission point information A and the second set of permission point information B (i.e., A∩B) needs to be confirmed as the authentication set C to confirm the permissions that the user actually possesses.

In step S106, the method determines whether the candidate permission point information is in the authentication set C and, in step S107, determines that the authentication is successful if the candidate permission point information is in the authentication set. Alternatively, if the candidate permission point information is not in the authentication set, the method determines that authentication is unsuccessful in step S108.

Continuing the previous example, if a first set of permission point information, A, contains permission points {Q1, Q3, Q4} and a second set of permission point information, B, contains permission points {Q2, Q3, Q4, Q5, Q6, Q10}. Then the method may determine that the authentication set, C, is equal to the intersection of sets A and B (i.e., A∩B), that is, the set including permission points {Q3, Q4}.

If the authentication request sent by the terminal carries the candidate permission point information Q3 and Q4, that is, the set {Q3, Q4}, the method can confirm that the authentication is successful and that the user of the terminal possesses the corresponding permission to access the resources of the application system since these permission points (Q3 and Q4) are present in the authentication set C. Conversely, if the authentication request sent by the terminal carries candidate permission point information which is not in the authentication set C, for example, Q5, the method can confirm that the authentication is unsuccessful, and the user of the terminal does not possess the corresponding permission to access the resources of the application system.

Figure 3:
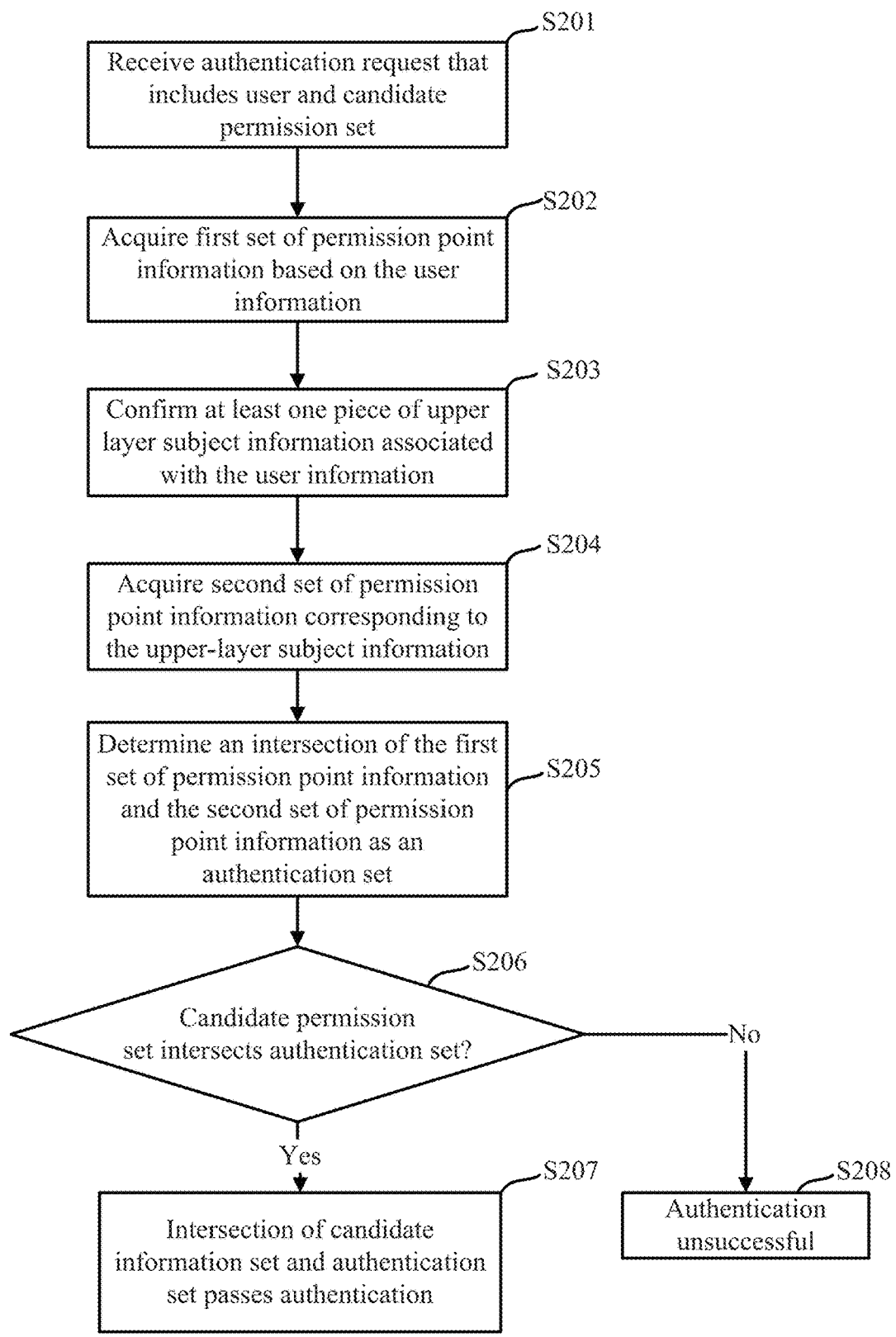
FIG. 3 is a flowchart of an authentication method according to some embodiments of the present disclosure.

FIG. 3 is a flowchart of an authentication method according to some embodiments of the present disclosure. The authentication method may be executed, for example, by a server of an application system.

In step S201, the method receives an authentication request that includes user information and a candidate information set from a terminal, wherein the candidate information set includes at least one piece of candidate permission point.

In step S202, the method acquires a first set of permission point information, A, based on the user information and including at least one piece of permission point information based on the user information.

In step S203, the method confirms at least one piece of upper layer subject information associated with the user information.

In step S204, the method acquires a second set of permission point information, B, corresponding to the upper layer subject information and including at least one piece of permission point information according to the at least one piece of upper layer subject information.

In step S205, the method determines the intersection of the first set of permission point information A and the second set of permission point information B as an authentication set C.

The candidate information set, D, utilized in steps S201 to S205 may be received in a similar manner as described with respect to steps S101 to S105, and is not repeated herein for the sake of clarity.

In step S206, the method determines whether the candidate information set D intersects with the authentication set C.

In step S207, if the candidate information set, D, intersects with the authentication set, C, the method determines the intersection of the candidate information set D and the authentication set C as a set of permission point information, E (i.e., E=D∩C), corresponding to the current authentication request and determines that the authentication request passes authentication. Alternatively, if the candidate information set D does not intersect with the authentication set C, the method determines that authentication is unsuccessful in step S208.

In the embodiments of the present disclosure, if the set E is equal to both set D and the intersection of sets D and C (i.e., E=D∩C=D), this indicates that the candidate information set D is a subset of the authentication set C. That is, all the candidate permission point information included in the candidate information set D falls within the authentication set C. In this case, it may be determined that the authentication is successful. If the set E and the intersection of sets D and C, are empty sets (i.e., E=D∩C=∅), this indicates that none of the candidate permission point information included in the candidate information set D falls in the authentication set C. In this case, it may be confirmed that the authentication is unsuccessful. If the set E and the intersection of sets D and C are a non-empty set (i.e., E=D∩C=a non-empty set), but set E is a subset of set D, this indicates that some of the candidate permission point information included in the candidate information set D falls in the authentication set C. In this case, it may be determined that the authentication is partially successful.

Through the above process, the successfully authenticated permissions of the user using the terminal may be confirmed according to the permission point information included in the set E, wherein E is the intersection of sets D and C (i.e., E=D∩c).

Figure 4:
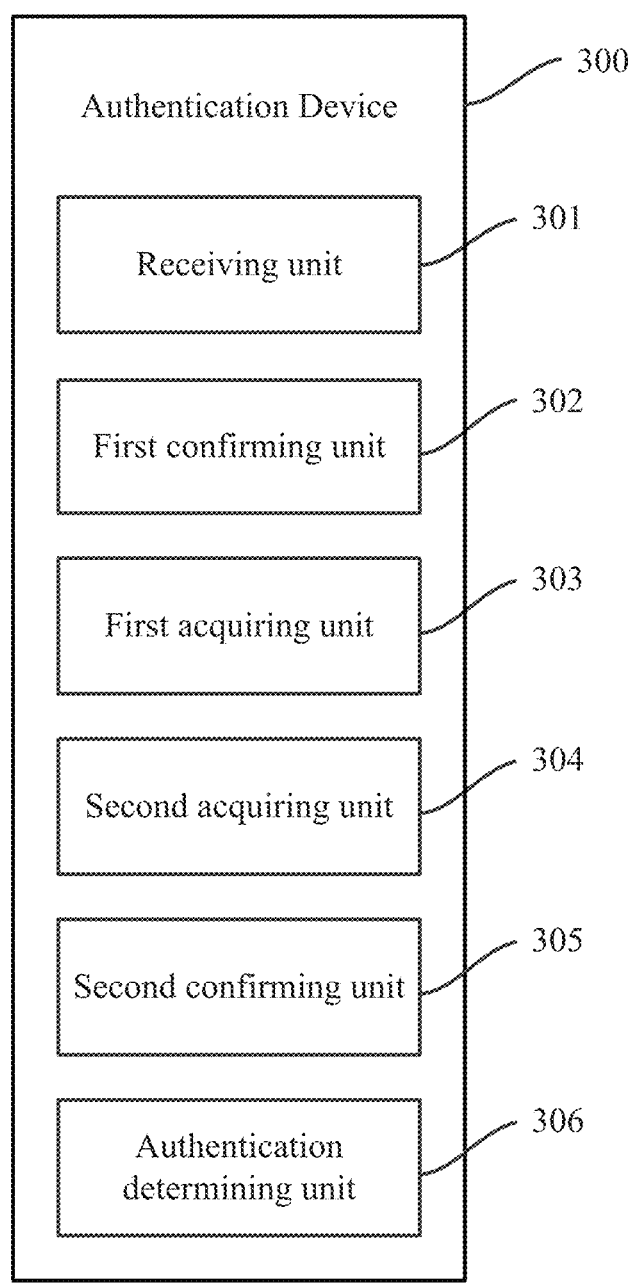
FIG. 4 is a diagram illustrating an authentication apparatus according to some embodiments of the present disclosure.

FIG. 4 is a diagram illustrating an authentication apparatus according to some embodiments of the present disclosure. The authentication apparatus includes the elements 301 to 306.

A receiving unit 301 is configured to receive an authentication request that includes user information and candidate permission point information. In one embodiment, the receiving unit 301 may receive the authentication request from a user terminal.

A first confirming unit 302 is configured to confirm at least one piece of upper layer subject information associated with the user information.

A first acquiring unit 303 is configured to acquire a first set of permission point information associated with the user information that includes at least one piece of permission point information according associated with the user information.

A second acquiring unit 304 is configured to acquire a second set of permission point information associated with the upper layer subject information that includes at least one piece of permission point information.

A second confirming unit 305 is configured to determine the intersection of the first set of permission point information and the second set of permission point information. The resulting intersection represents an authentication set.

An authentication determining unit 306 is configured to determine whether the candidate permission point information is in the authentication set, and determine that the authentication is successful if the candidate permission point information is in the authentication set.

In some embodiments of the present disclosure, the second acquiring unit 304 is configured to, if there are at least two pieces of upper layer subject information, acquire a permission set including the at least one piece of permission point information corresponding to each of the two pieces of upper layer subject information, and determine the intersection of the permission sets corresponding to each of the at least two pieces of upper layer subject information as the second set.

In some embodiments of the present disclosure, if the upper layer subject information includes tenant information and project information, then the first confirming unit 302 is further configured to confirm tenant information associated with the user information and confirm project information pertaining to the tenant information and associated with the user information.

The second acquiring unit 304 is then further configured to acquire a permission set corresponding to the tenant information and including at least one piece of permission point information, acquire a permission set corresponding to the project information and including at least one piece of permission point information, and determine the intersection of the permission set corresponding to the tenant information and the permission set corresponding to the project information as the second set of permission point information.

In some embodiments of the present disclosure, the first acquiring unit 302 may further be configured to query first role information mapped to the received user information, wherein the first role information may be used for identifying a role of a user identified by the user information in an upper layer subject corresponding to the upper layer subject information. The first acquiring unit 302 may additionally acquire a first set of permission point information including at least one piece of permission point information and the first set being mapped to the first role information.

The second acquiring unit 304 may further be configured to query at least one second role information mapped to the at least one piece of upper layer subject information, wherein the second role information is used for identifying a role of an upper layer subject corresponding to each of the at least one upper layer subject information in an application system. The second acquiring unit 304 may additionally acquire a second set including at least one piece of permission point information and the second set being mapped to the second role information.

Figure 5:
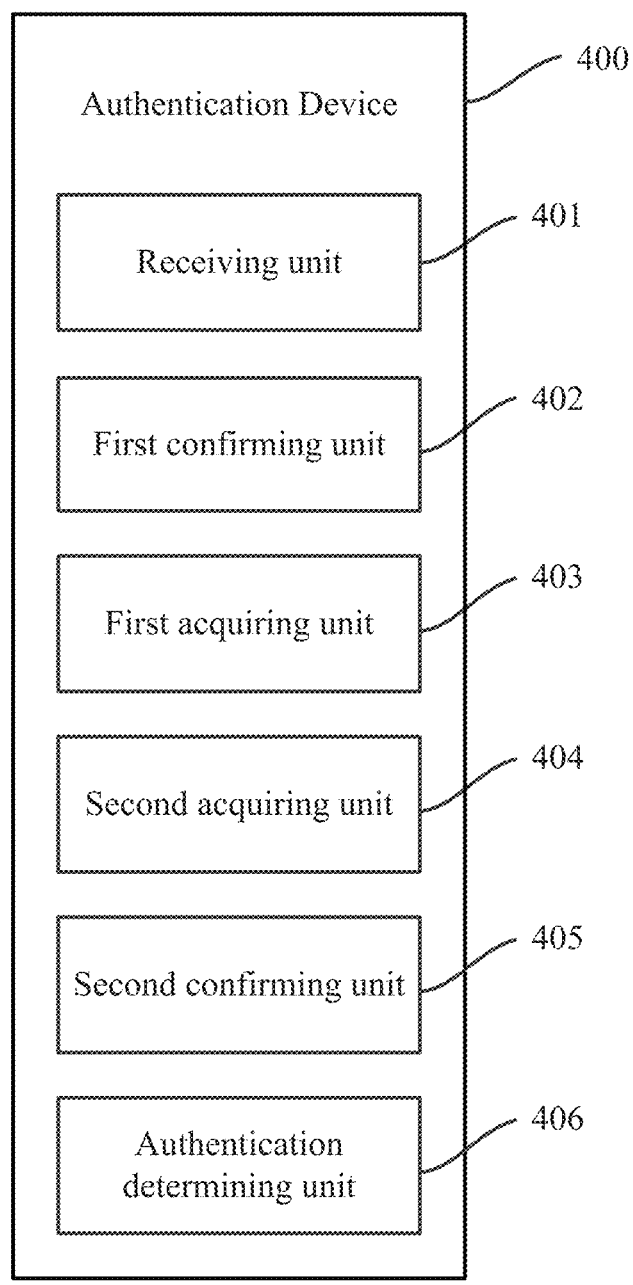
FIG. 5 is a diagram illustrating an authentication apparatus according to some embodiments of the present disclosure.

FIG. 5 is a diagram illustrating an authentication apparatus according to some embodiments of the present disclosure. The authentication apparatus 400 includes the elements 401 to 406.

A receiving unit 401 is configured to receive an authentication request that includes user information and a candidate information set from a terminal, wherein the candidate information set includes at least one piece of candidate permission point information.

A first confirming unit 402 is configured to confirm at least one piece of upper layer subject information associated with the user information.

A first acquiring unit 403 is configured to acquire a first set of permission point information associated with the user information that includes at least one piece of permission point information associated with the user information.

A second acquiring unit 404 is configured to acquire a second set of permission point information associated with the upper layer subject information that includes at least one piece of permission point information according to the at least one piece of upper layer subject information.

A second confirming unit 405 is configured to determine the intersection of the first set of permission point information and the second set of permission point information. The resulting intersection represents an authentication set.

An authentication determining unit 406 is configured to determine whether the candidate information set intersects with the authentication set, and if the candidate information set intersects with the authentication set, confirm the intersection of the candidate information set and the authentication set as a set of permission point information which passes the authentication.

In some embodiments of the present disclosure, the second acquiring unit 404 is configured to, if there are at least two pieces of upper layer subject information, acquire a permission set including the at least one piece of permission point information corresponding to each of the two pieces of upper layer subject information and determine an intersection of the permission sets corresponding to each of the two pieces of upper layer subject information as the second set of permission point information.

In some embodiments of the present disclosure, if the upper layer subject information includes tenant information and project information, then the first confirming unit 402 is further configured to confirm tenant information associated with the user information, and confirm project information pertaining to the tenant information and associated with the user information.

The second acquiring unit 404 is may further be configured to acquire a permission set corresponding to the tenant information and comprising at least one piece of permission point information, acquire a permission set corresponding to the project information and including at least one piece of permission point information, and determine an intersection of the permission set corresponding to the tenant information and the permission set corresponding to the project information as the second set of permission point information.

In some embodiments of the present disclosure, the first acquiring unit 402 is further configured to query a first role information mapped to the user information, wherein the first role information is used for identifying a role of a user corresponding to the received user information in an upper layer subject corresponding to the upper layer subject information, and query a first set including at least one piece of permission point information and the first set being mapped to the first role information.

The second acquiring unit 404 is then further configured to query at least one second role information mapped to the at least one piece of upper layer subject information, wherein the second role information is used for identifying a role of an upper layer subject corresponding to each of the at least one upper layer subject information in an application system, and query a second set including at least one piece of permission point information and the second set being mapped to the second role information.

For ease of description, in the descriptions above the apparatuses are divided into various units according to function for separate description. Nevertheless, the function of each unit may be implemented as the described unit or as a plurality of software and/or hardware components in other embodiments.

Those skilled in the art will understand that the embodiments may be described as illustrating methods, systems, or computer program products. Therefore, hardware embodiments, software embodiments, or hardware-plus-software embodiments may be used to illustrate the present invention. In addition, the present invention may further employ a computer program product which may be implemented by at least one non-transitory computer-readable storage medium with an executable program code stored thereon. The non-transitory computer-readable storage medium comprises but not limited to a disk memory, a CD-ROM, and an optical memory.

The present invention is described based on the flowcharts and/or block diagrams of the method, device (system), and computer program product. It should be understood that each process and/or block in the flowcharts and/or block diagrams, and any combination of the processes and/or blocks in the flowcharts and/or block diagrams may be implemented using computer program instructions. These computer program instructions may be issued to a computer, a dedicated computer, an embedded processor, or processors of other programmable data processing device to generate a machine, which enables the computer or the processors of other programmable data processing devices to execute the instructions to implement an apparatus for implementing specific functions in at least one process in the flowcharts and/or at least one block in the block diagrams.

These computer program instructions may also be stored a non-transitory computer-readable memory capable of causing a computer or other programmable data processing devices to work in a specific mode, such that the instructions stored on the non-transitory computer-readable memory implement a product comprising an instruction apparatus, wherein the instruction apparatus implements specific functions in at least one process in the flowcharts and/or at least one block in the block diagrams.

These computer program instructions may also be stored on a computer or other programmable data processing devices, such that the computer or the other programmable data processing devices execute a series of operations or steps to implement processing of the computer. In this way, the instructions, when executed on the computer or the other programmable data processing devices, implement the specific functions in at least one process in the flowcharts and/or at least one block in the block diagrams.

It should be noted that, in this specification, terms "comprises", "comprising", "has", "having", "includes", "including", "contains", "containing" or any other variation thereof, are intended to cover a non-exclusive inclusion, such that a process, method, article, or device, that comprises, has, includes, contains a list of elements does not include only those elements but may include other elements not expressly listed or inherent to such process, method, article, or device. An element proceeded by "comprises . . . a", "has . . . a", "includes . . . a", "contains . . . a" does not, without more constraints, preclude the existence of additional identical elements in the process, method, article, or device.

The present disclosure may be described in the general context of the computer executable instructions executed by the computer, for example, a program module. Generally, the program module comprises a routine, program, object, component or data structure for executing specific tasks or implementing specific abstract data types. The present disclosure may also be practiced in distributed computer environments. In such distributed computer environments, the tasks are executed by a remote device connected via a communication network. In the distributed computer environments, the program module may be located in the local and remote computer storage medium including the storage device.

Various embodiments in the specification are described in a progressive manner. The same or similar parts between the embodiments may be referenced to each other. In each embodiment, the portion that is different from other embodiments is concentrated and described. In particular, with respect to a system, since it is substantially similar to the method embodiment, brief description is given. The related portions may be referenced to the description of the portions in the method embodiments.

Detailed above are embodiments of the present disclosure, and are not intended to limit the present disclosure. For those skilled in the art, the present disclosure may be subjected to various modifications and variations. Any modification, equivalent replacement, or improvement made without departing from the spirit and principle of the present disclosure should fall within the protection scope of the present disclosure.

What is claimed is:

1. A method for authenticating a user in an application system, the method comprising:
   receiving, at a server, an authentication request, the authentication request including user information and candidate permission point information;
   confirming, by the server, at least one piece of upper layer subject information associated with the user information, the upper layer subject comprising one of a tenant or project;
   acquiring, by the server, a first set of permission point information associated with the user information, the first set of permission point information including at least one piece of permission point information associated with the user information, the first set of permission point information controlling user access to computing resources managed by the server;
   acquiring, by the server, a second set of permission point information associated with the at least one upper layer subject information, the second set of permission point information including at least one piece of permission point information associated with the at least one piece of upper layer subject information, the second set of permission point information controlling upper layer subject access to the computing resources managed by the server;
   determining, by the server, an authentication set based on an intersection of the first set of permission point information and the second set of permission point information, the intersection comprising a set of permission point information authorized for the user and authorized for the upper layer subject information; and
   determining, by the server, that the authentication is successful if the candidate permission point information is in the authentication set.

2. The method according to claim 1, wherein the user information includes at least two pieces of upper layer subject information and wherein the acquiring the second set of permission point information comprises:
   acquiring, by the server, permission sets associated with the at least two pieces of the upper layer subject information; and
   determining, by the server, an intersection of the permission sets as the second set of permission point information.

3. The method according to claim 1, wherein the at least one piece of upper layer subject information includes tenant information and project information, wherein the confirming at least one piece of upper layer subject information comprises:
   confirming, by the server, tenant information associated with the user information; and
   confirming, by the server, project information associated with the tenant information and associated with the user information, and
   wherein acquiring the second set of permission point information comprises:
   acquiring, by the server, a permission set associated with the tenant information and including at least one piece of permission point information;
   acquiring, by the server, a permission set associated with the project information and including at least one piece of permission point information; and
   determining, by the server, an intersection of the permission set associated with the tenant information and the permission set associated with the project information as the second set of permission point information.

4. The method according to claim 1, wherein acquiring the first set of permission point information includes querying first role information mapped to the user information, the first role information identifying a role associated with the user information in an upper layer subject identified by the at least one piece of upper layer subject information, and wherein the first set of permission point information is mapped to the first role information.

5. The method according to claim 1, wherein acquiring the second set of permission point information includes querying at least one piece of second role information mapped to the at least one piece of upper layer subject information, the second role information identifying a role of an upper layer subject for each piece of upper layer subject information in the application system, and wherein the second set is mapped to the second role information.

6. A method for authenticating a user in an application system, the method comprising:
   receiving, by a server, an authentication request including user information and a candidate information set, the candidate information set including at least one piece of candidate permission point information;
   confirming, by the server, at least one piece of upper layer subject information associated with the user information, the upper layer subject comprising one of a tenant or project;
   acquiring, by the server, a first set of permission point information associated with the user information and including at least one piece of permission point information associated with the user information, the first set of permission point information controlling user access to computing resources managed by the server;
   acquiring, by the server, a second set of permission point information associated with the at least one upper layer subject information, the second set of permission point information including at least one piece of permission point information associated with the at least one piece of upper layer subject information, the second set of permission point information controlling upper layer subject access to the computing resources managed by the server;

determining, by the server, an authentication set based on an intersection of the first set of permission point information and the second set of permission point information, the intersection comprising a set of permission point information authorized for the user and authorized for the upper layer subject information; and determining, by the server, a third set of permission point information associated with the authentication request as passing authentication if the candidate information set intersects with the authentication set.

7. The method according to claim 6, wherein the user information includes at least two pieces of upper layer subject information and wherein the acquiring the second set of permission point information comprises:

acquiring, by the server, permission sets associated with the at least two pieces of the upper layer subject information; and determining, by the server, an intersection of the permission sets as the second set of permission point information.

8. The method according to claim 6, wherein confirming at least one piece of upper layer subject information comprises:

confirming, by the server, tenant information associated with the user information; and confirming, by the server, project information associated with the tenant information and associated with the user information, and wherein acquiring the second set, when the upper layer subject information includes tenant information and project information, comprises:

acquiring, by the server, a permission set associated with the tenant information and including at least one piece of permission point information;

acquiring, by the server, a permission set associated with the project information and including at least one piece of permission point information; and determining, by the server, an intersection of the permission set associated with the tenant information and the permission set associated with the project information as the second set of permission point information.

9. The method according to claim 6, wherein the acquiring the first set of permission point information comprises querying first role information mapped to the user information, the first role information identifying a role associated with the user information in an upper layer subject identified by at least one piece of upper layer subject information, and wherein the first set of permission point information is mapped to the first role information.

10. The method according to claim 6, wherein acquiring the second set of permission point information comprises querying at least one piece of second role information mapped to the at least one piece of upper layer subject information, the second role information identifying a role of an upper layer subject for each piece of upper layer subject information in the application system, and wherein the second set is mapped to the second role information.

11. An apparatus for authenticating a user in an application system, the apparatus comprising:
a processor; and a non-transitory memory storing computer-executable instructions therein that, when executed by the processor, cause the apparatus to:

receive an authentication request, the authentication request including user information and candidate permission point information;

confirm at least one piece of upper layer subject information associated with the user information, the upper layer subject comprising one of a tenant or project;

acquire a first set of permission point information associated with the user information, the first set of permission point information including at least one piece of permission point information associated with the user information, the first set of permission point information controlling user access to computing resources managed by the server;

acquire a second set of permission point information associated with the at least one upper layer subject information, the second set of permission point information including at least one piece of permission point information associated with the at least one piece of upper layer subject information, the second set of permission point information controlling upper layer subject access to the computing resources managed by the server;

determine an authentication set based on an intersection of the first set of permission point information and the second set of permission point information, the intersection comprising a set of permission point information authorized for the user and authorized for the upper layer subject information; and determine that the authentication is successful if the candidate permission point information is in the authentication set.

12. The apparatus according to claim 11, wherein the user information includes at least two pieces of upper layer subject information and wherein the instruction to acquire a second set of permission point information further causes the apparatus to:

acquire permission sets associated with the at least two pieces of the upper layer subject information; and determine an intersection of the permission sets as the second set of permission point information.

13. The apparatus according to claim 11, wherein the at least one piece of upper layer subject information includes tenant information and project information, wherein the instruction to confirm at least one piece of upper layer subject information further causes the apparatus to:

confirm tenant information associated with the user information; and confirm project information associated with the tenant information and associated with the user information, and wherein the instruction to acquire the second set of permission point information further causes the apparatus to:

acquire a permission set associated with the tenant information and including at least one piece of permission point information;

acquire a permission set associated with the project information and including at least one piece of permission point information; and determine an intersection of the permission set associated with the tenant information and the permission set associated with the project information as the second set of permission point information.

14. The apparatus according to claim 11, wherein the instruction to acquire the first set of permission point information further causes the apparatus to query first role information mapped to the user information, the first role information identifying a role associated with the user information in an upper layer subject identified by the at least one piece of upper layer subject information, and wherein the first set of permission point information is mapped to the first role information.

15. The apparatus according to claim 11, wherein the instruction to acquire the second set of permission point information further causes the apparatus to query at least one piece of second role information mapped to the at least one piece of upper layer subject information, the second role information identifying a role of an upper layer subject for each piece of upper layer subject information in the application system, and wherein the second set is mapped to the second role information.

16. An apparatus for authenticating a user in an application system, the apparatus comprising:
a processor; and
a non-transitory memory storing computer-executable instructions therein that, when executed by the processor, cause the apparatus to:
receive an authentication request including user information and a candidate information set, the candidate information set including at least one piece of candidate permission point information;
confirm at least one piece of upper layer subject information associated with the user information, the upper layer subject comprising one of a tenant or project;
acquire a first set of permission point information associated with the user information and including at least one piece of permission point information associated with the user information, the first set of permission point information controlling user access to computing resources managed by the server;
acquire a second set of permission point information associated with the at least one upper layer subject information, the second set of permission point information including at least one piece of permission point information associated with the at least one piece of upper layer subject information, the second set of permission point information controlling upper layer subject access to the computing resources managed by the server;
determine an authentication set based on an intersection of the first set of permission point information and the second set of permission point information, the intersection comprising a set of permission point information authorized for the user and authorized for the upper layer subject information; and
determine a third set of permission point information associated with the authentication request as passing authentication if the candidate information set intersects with the authentication set.

17. The apparatus according to claim 16, wherein the user information includes at least two pieces of upper layer subject information wherein the instruction to acquire a second set of permission point information further causes the apparatus to:
acquire permission sets associated with the at least two pieces of the upper layer subject information; and
determine an intersection of the permission sets as the second set of permission point information.

18. The apparatus according to claim 16, wherein the upper layer subject information includes tenant information and project information, wherein the instruction to confirm at least one piece of upper layer subject information further causes the apparatus to:
confirm tenant information associated with the user information; and
confirm project information associated with the tenant information and associated with the user information, and
wherein the instruction to acquire the second set of permission point information further causes the apparatus to:
acquire a permission set associated with the tenant information and including at least one piece of permission point information;
acquire a permission set associated with the project information and including at least one piece of permission point information; and
determine an intersection of the permission set associated with the tenant information and the permission set associated with the project information as the second set of permission point information.

19. The apparatus according to claim 16, wherein the instruction to acquire the first set of permission point information further causes the apparatus to query first role information mapped to the user information, the first role information identifying a role associated with the user information in an upper layer subject identified by at least one piece of upper layer subject information, and wherein the first set of permission point information is mapped to the first role information.

20. The apparatus according to claim 16, wherein the instruction to acquire the second set of permission point information further causes the apparatus to query at least one piece of second role information mapped to the at least one piece of upper layer subject information, the second role information identifying a role of an upper layer subject for each piece of upper layer subject information in the application system, and wherein the second set is mapped to the second role information.

* * * * *